United States Patent [19]
Page

[11] 4,128,837
[45] Dec. 5, 1978

[54] PREDICTION COMPUTATION FOR WEAPON CONTROL

[75] Inventor: Jerome M. Page, Fullerton, Calif.

[73] Assignee: Rockwell International Corporation, El Segundo, Calif.

[21] Appl. No.: 747,781

[22] Filed: Jul. 22, 1968

[51] Int. Cl.² ............................................. G06G 7/80
[52] U.S. Cl. .............................. 343/7 G; 89/41 SW; 235/412
[58] Field of Search ................. 343/7 ED; 89/41 SW; 235/61.5, 150.25, 150.26, 411–416; 343/7 G

[56] References Cited
U.S. PATENT DOCUMENTS

| 3,232,103 | 2/1966 | Schneider | 235/150.25 X |
| 3,290,992 | 12/1966 | Blomqvist | 89/41 |
| 3,982,246 | 9/1976 | Lubar | 235/414 X |

Primary Examiner—T.H. Tubbesing
Attorney, Agent, or Firm—L. Lee Humphries; H. Fredrick Hamann; Rolf M. Pitts

[57] ABSTRACT

In an airborne armament fire control prediction computer, apparatus for computing smoothed inertial velocity and acceleration components of an observed target in a three-dimensional Cartesian coordinate system. A target tracking sensor mechanization is provided which generates target position, velocity, and acceleration data components in an inertially-stabilized Cartesian coordinate system, whereby improved closed-loop pilot-aircraft weapon control system dynamic stability and accuracy result. Target sensor dynamic tracking accuracy improvement and noise reduction are also obtained by virtue of such inertially stabilized tracking mechanization.

18 Claims, 6 Drawing Figures

R = RANGE TO TARGET
$\overline{V}_T$ = TARGET VELOCITY
$\overline{V}_A$ = INTERCEPTOR VELOCITY
$\overline{V}_O$ = PROJECTILE RELATIVE VELOCITY
T = TIME UNTIL MISSILE IMPACT
$T_f$ = MISSILE TIME OF FLIGHT
$\overline{E}$ = LAUNCH ERROR

INVENTOR.
JEROME M. PAGE
BY
ATTORNEY

PREDICTION COMPUTATION FOR WEAPON CONTROL

BACKGROUND OF THE INVENTION

The aiming and firing of missiles and projectiles from a maneuvering airborne weapon platform such as a military aircraft involves the computation of and comparison of the predicted trajectories of the target and the missile to determine necessary steering changes to be applied in the control of the weapon platform. Such fire control technique conventionally employs the line-of-sight range to the target, and the direction angle components of the line-of-sight direction, as determined by a radar system. In such application, the radar system may preferably be of the tracking type, whereby the radar antenna boresight axis is servoed or otherwise maintained substantially coincident with the line of sight (L.O.S.) to the target.

The target position information thus provided by the radar is expressed in the polar coordinates of the antenna which may be rotating relative to the platform on which it is mounted, which platform itself may be rotating relative to inertial space. Hence, the computation of predicted future target positions employing time derivative or rate-of-change data involves the differentiation of a vector quantity measured in a rotating coordinate system. Such computation has involved the computation of cross products of angular rates. Also, such differentiation process magnifies noise content of the signals (as is well understood) as to require low pass filtering to attenuate such noise. Prediction of target acceleration (usually termed second order) has not been practiced for many airborne systems because of noise problems.

Prior art smoothing techniques in fire control prediction computation, using tracking radars, have effected vector filtering by means of rate gyros on the radar antenna. Forms of such techniques are described for exmple in U.S. Pat. No. 3,123,822 issued to R. G. Shelley, et al, for Filter for Information Expressed in Rotating Coordinates; U.S. Pat. No. 3,185,817 issued to R. G. Shelley for Gyroscope Filtering and Computing System; and U.S. Pat. No. 2,805,022 issued to R. G. Shelley for Vector Filter System. Such techniques serve to smooth the target position and rate gyro data provided by the radar. Because such position and rate gyro data represents the effect of both ownship motion and target motion, such smoothing inserts a lag in ownship data. In other words, the radar tracking filter is in the tracking loop, as to inert the filter lag in the tracking loop as a contribution to fire-control errors and tends to decrease tracking stability of the pilot. Also, the use of such rate gyros contributes to the angular errors due to the inherent thresholds and non-linearities of operation and the output noise levels of such devices. The mechanization of such gyroscope filters, by means including instrument servos of limited accuracy and limited dynamic response, contributes additional noise and error. Such noise levels in general prevent the use of second order prediction techniques as to limit the theoretical accuracies obtainable.

Radar track mechanizations currently used require high dynamic response to stabilize against aircraft maneuver, thereby making the radar more susceptible to ECM equipment and techniques.

As military aircraft speeds increase, it is necessary to fire the weapons of such arcraft at increased ranges and with reduced reaction time. Such increased ranges in conjunction with allowable missdistances thus define allowable angular steering errors of decreasing magnitudes. Such smaller allowable angular steering errors thus tend to require greater accuracies than those obtainable from the rate gyro state-of-the-art, and tend to make intolerable that time-lag imposed on ownship motion data due to inclusion of the radar prediction filter in the overall geometry-control loop. Also, such need for increased accuracy tends to require the use of second order prediction techniques rather than more approximate methods of fire control computation for the short range delivery of missiles against maneuvering targets.

SUMMARY OF THE INVENTION

By means of the concept of the invention, the above noted disadvantages of the prior art are avoided, and smoothed target data are provided by other than gyro filters for use in second order prediction.

In a preferred embodiment of the inventive concept, there is provided a fire control system comprising an inertial platform and high speed computing means including a coordinate converter for spatial stabilization of the antenna of a tracking radar, and conversion of the polar coordinates of the radar data to that space-stabilized Cartesian coordinate system in which the navigation system resolves the motion of the weapon platform or vehicle upon which the fire control system is mounted.

There is further provided closed loop integrating means responsive to the resolved target position and resolved weapon platform velocity for computing the smoothed resolution components of the target velocity. Such closed loop technique may also be employed to derive the smoothed resolution components of the target acceleration, for use in second order prediction of the target position. Such technique avoids the use of rate gyros mounted on the antenna as to avoid the errors and noise attendant with rate gyro filtering techniques. Also, because antenna-mounted rate gyros are not used, no filtering of weapon platform data occurs; only target motion data is filtered. Therefore, data of increased accuracy and less noise is provided. Because such improved data is provided, second order prediction becomes practical as well as being theoretically necessary to achieve the desired fire control system accuracies. Accordingly, a broad object of the subject invention is to provide an improved fire control system for use by maneuvering aircraft.

It is another object of the invention to provide target position data suitable for use in a second order prediction system.

It is a further object to provide means for deriving smoothed target velocity data in Cartesian coordinate form.

Still another object is to provide both target prediction and radar track stabilization within the same system mechanization.

These and other objects of the invention may be more fully appreciated from the following description, taken together with the accompanying drawings in which:

BRIEF DESCRIPTION OF THE DRAWINGS

In the figures, like reference characters refer to like parts.

Referring now to FIG. 1 there is illustrated a diagram of the geometry of an exemplary fire control problem solved by an airborne fire control system.

Referring to FIG. 1, there is illustrated a vector diagram of the geometry of an exemplary fire control problem solved by an airborne radar-aided fire control system, in which the direction and distance to the target is indicated by the vector $\overline{R}$. The future position of a missile fired from the weapon vehicle (from which the target is observed) at a predicted missile impact time is equal to the vector sum of two products: the factors of the first product are the weapon vehicle velocity vector $\overline{V}_A$ and the time until missile impact T; the factors of the second product being the relative velocity vector $\overline{V}_o$ of the missile and the missile time of flight, $t_f$. The future position of the target at such impact is equal to the vector sum of the target range $\overline{R}$ and the product of target velocity vector $\overline{V}_T$ and the impact time interval T. The perpendicular distance $\overline{E}$ from the missile track to the predicted target position represents the predicted miss distance. The ratio of such miss distance to the predicted impact range along the direction of the weapon platform velocity vector is indicative of a steering angle error which is corrected for by compensatorily changing the flight path direction of the weapon platform (i.e., change the direction of the velocity vector $\overline{V}_A$ so as to reduce $\overline{E}$ to zero).

The parameters of $\overline{V}_o$ and $t_f$ for a given armament or missile and tactical approach (lead-collision, lead pursuit, etc.) are in general known or computed and are included in the data stored in or generated by a ballistic computer for the computation of steering control signals. The parameter $\overline{V}_T$ is, in general, not known and must be determined from other measured data such as own ship velocity vector $\overline{V}_A$ and the rate of change of target range vector $\overline{R}$, for use in the prediction computation of $\overline{V}_T T$. Such determination may be more accurately and effectively done where all such vector quantities are resolved in a common non-rotating Cartesian coordinate system and processed by means of the arrangement shown in FIG. 2.

Figure 1:
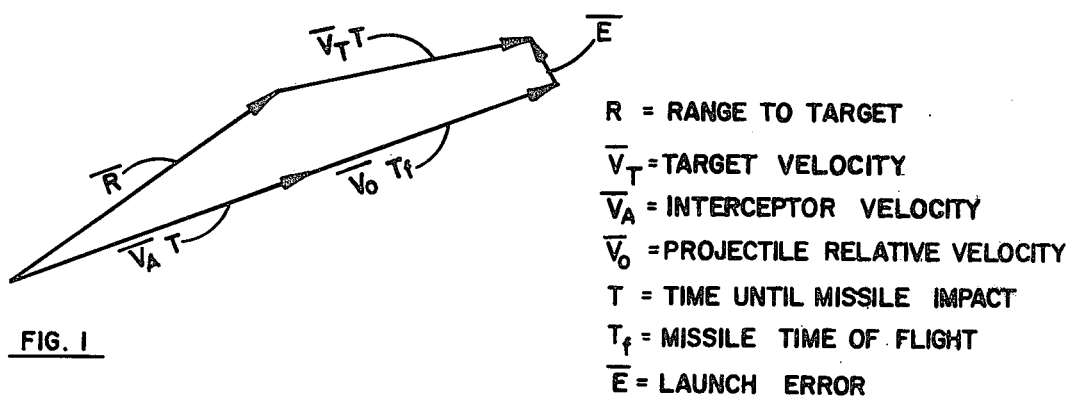
FIG. 1 is a diagram of the geometry of an exemplary fire control problem solved by an airborne fire control system.
Figure 2:
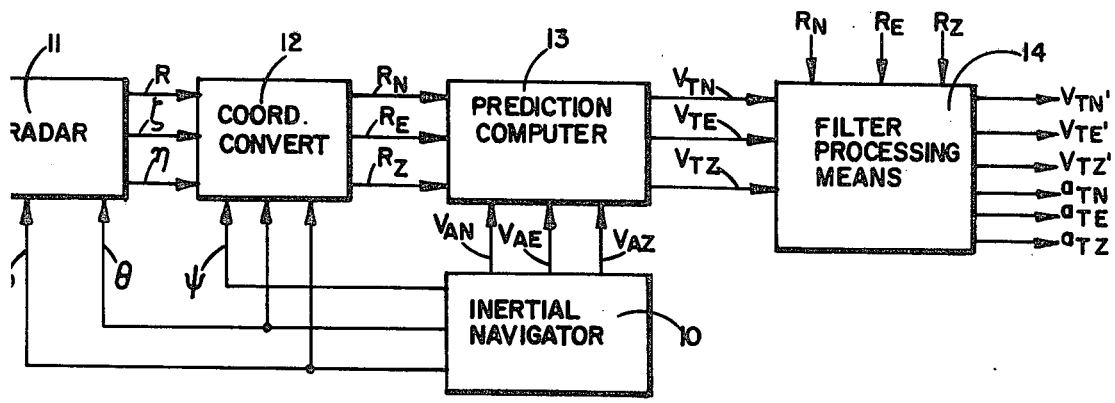
FIG. 2 is a block diagram of a system embodying the concept of the invention and adapted for use in solving the fire control intercept problem of FIG. 1.

Referring to FIG. 2, there is illustrated a system embodying the concept of the invention. There is provided an automatic inertial navigator 10 adapted to be mounted on the weapon platform for determining the weapon platform velocity vector $\overline{V}_A$ in terms of the resolution components thereof, $V_{AN}$, $V_{AE}$ and $V_{AZ}$, as resolved in a Cartesian coordinate system, which is substantially non-rotating over the interval of the attack upon a target. There is also provided a ranging device such as a tracking radar 11 or like sensor for detecting the range distance and direction (i.e., the range vector, $\overline{R}$) of the target. In other words, the target position data is provided in polar coordinates employing the coordinate system of the antenna of the tracking radar 11. The antenna control system of the tracking radar system is responsive to signals indicative of the roll and pitch motion of the weapon platform, as provided by an inertial platform of inertial navigator 10, for spatial stabilization of the antenna system against rolling and pitching maneuvers of the weapon platform, whereby the antenna need only be rotated in azimuth relative to the orientation of the inertial platform of inertial navigator 10.

The construction, arrangement and operation of inertial navigator system are well understood in the art, as indicated for example in the following U.S. Pat. Nos. 3,282,118 issued to N. F. Parker; 3,269,024 issued to J. J. Fischer, et al; and 2,993,267 issued to J. M. Slater, et al. Accordingly, navigator 10 is shown in block form only for convenience in exposition.

The computed target position data output (R, $\zeta$ and $\eta$) of radar 11 (in FIG. 2) is applied as inputs to the polar coordinate converter 12 (which is responsive to the weapon vehicle heading $\psi$) for conversion to the Cartesian coordinate system ($R_N$, $R_E$ and $R_Z$) employed by inertial navigator 10. Such conversion involves multiplication of the scalar range quantity R by suitable direction cosines, as is well understood in the art, and is done conveniently by digital computation techniques upon conversion of the parameters of interest to digitally-encoded form for such purposes. Such coordinate conversion may be simplified if the weapon platform roll and pitch ($\phi$ and $\theta$) data is additionally utilized.

The Cartesian-coordinate resolved target range components ($R_N$, $R_E$ and $R_Z$) provided by coordinate converter 12, together with the similarly resolved components of weapon platform velocity ($V_{AN}$, $V_{AE}$ and $V_{AZ}$), are employed by a prediction computer 13 for computing the smoothed components of target inertial velocity ($V_{TN}$, $V_{TE}$ and $V_{TZ}$). Such apparatus for computing each of such smoothed target velocity components comprises like closed loop integrating means, the arrangement of a representative one of which is shown more particularly in FIG. 3.

Figure 3:
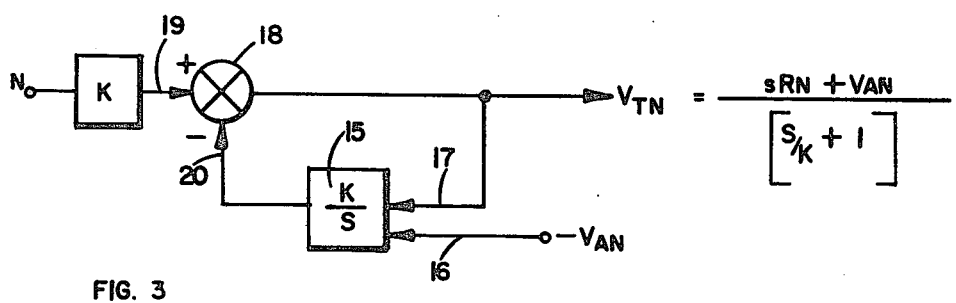
FIG. 3 is a schematic arrangement in block diagram form of one of the target range rate computers of FIG. 2.

Referring to FIG. 3, there is illustrated in block diagram form one of the three like closed loop integrating means comprising the prediction computing means 13 of FIG. 2 responsive to the observed range R of the target, resolved along a preselected axis of a preselected Cartesian coordinate system, and further responsive to the velocity $V_A$ of the weapon platform, resolved along the same preselected axis of the same coordinate system of the resolved target range, to provide a smoothed target velocity component $V_T$, resolved along the same axis as said resolved target range and platform velocity, in accordance with the following expression:

$$V_T = \frac{sR + V_A}{ts + 1} \quad (1)$$

where
$t$ = first order lag time constant
$s$ = Laplace operator

In such arrangement of FIG. 3, there is provided a signal integrator 15 having a first input 16 responsive to a component $V_{AN}$ of an observer's velocity $V_A$ resolved along the preselected coordinate N (of the Cartesian coordinate system (N, E, Z)) and further having a second input 17. There is also provided signal summing means 18 providing an output $V_{TN}$ indicative of the smoothed resolved target velocity component and having a first input 19 responsive to a signal indicative of the observed range R of the target resolved along the N coordinate, and further having a second input 20 coupled to an output of signal integrator 15. Input 17 of integrator 15 is coupled to an output of summing means 18, whereby integrator 15 and summing means 18 cooperate in negative feedback fashion. Such negative feedback relation may be achieved by effecting a signal inversion stage within either of summing means 18 or integrator 15, as is well understood in the art. However, care must be taken to employ proper sense of the applied input signal at the first input of either of such elements.

The relationship of the output of summing means 18 to the combined inputs applied to the arrangement of FIG. 3 may be determined from a treatment of the closed loop response to each of such inputs: Let $$V_{TN} = V_{TN}(R_N) + V_{TN}(V_{AN}) \qquad (2)$$

which indicates that $V_{TN}$ is equal to the sum of the separate components thereof as respective functions of $V_{AN}$ and $R_N$, respectively. Considering the function, $V_{TN}(V_{AN})$:

$$\frac{V_{TN}(V_{AN})}{V_{AN}} = \frac{K/s}{1 + K/s} = \frac{1}{s/K + 1} \qquad (3)$$

Therefore:

$$V_{TN}(V_{AN}) = \frac{V_{AN}}{(s/K + 1)} \qquad (4)$$

which is seen to represent a simple first order lag, the time constant ($t$) for which being inversely proportional to the integrator gain term, K.

Considering the function, $V_{TN}(R_N)$:

$$\frac{V_{TN}(R_N)}{R_N} = \frac{1}{1 + K/s} = \frac{s/K}{s/K + 1} \qquad (5)$$

Therefore:

$$V_{TN}(R_N) = \frac{sR_N/K}{(s/K + 1)} \qquad (6)$$

which is seen to represent a differention (as indicated by the free "s" term divided by K) coupled with a like first order lag as Equation (3). Accordingly, the $R_N$ input is scaled by the factor K in FIG. 3:

$$V_{TN}(KR_N) = \frac{sR_N}{s/K + 1} = \frac{\dot{R}_N}{s/K + 1} \qquad (7)$$

In view of the common denominator forms of the righthand members of Equations (4) and (7), such expressions may be substituted in Equation (2):

$$V_{TN} = \frac{sR_N + V_{AN}}{(s/K + 1)} = \frac{\dot{R}_N + V_{AN}}{(ts + 1)} \qquad (8)$$

where $\dot{R}_N$ = time rate of change of $R_N$
$t$ = first order lag time constant
$s$ = Laplace operator In other words, the arrangement of FIG. 3 cooperates to provide a first order filtered expression for the component target velocity $V_{TN}$, which filtered component is further defined as the algebraic component sum of the observer's resolved velocity $V_{TN}$ and the rate of change of range $\dot{R}_N$.

The three smoothed components ($V_{TN}$, $V_{TE}$ and $V_{TZ}$) of target velocity $\overline{V}_T$, resolved in the non-rotating Cartesian coordinates system (N, E, Z) may then be subjected to further processing such as Kalman filtering techniques (if desired), by filter processing means 14 in FIG. 2, to provide filtered target velocity components, $V'_{TN}$, $V'_{TE}$ and $V'_{TZ}$. Additional processing may be included for providing smoothed components of target acceleration ($a_{TN}$, $a_{TE}$ and $a_{TZ}$) for use in second-order prediction computation of the target position at a selected future weapon impact point in time, T. Such processing to obtain the smoothed components of target acceleration may be effected in a manner similar to that illustrated in FIG. 3 for computing the smooth components of target velocity, as shown more particularly in FIG. 4.

Figure 4:
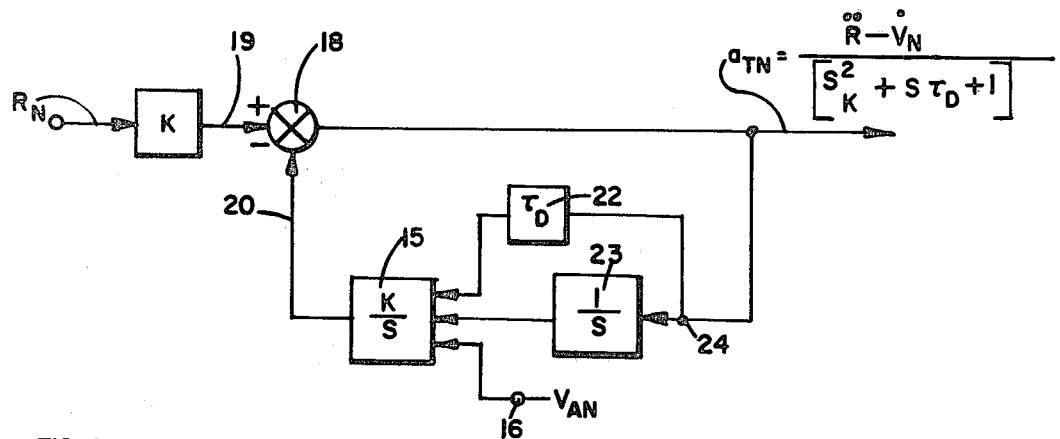
FIG. 4 is a schematic arrangement in block diagram form of one of the target acceleration computers of FIG. 2.

Referring now to FIG. 4, there is illustrated in block diagram form an arrangement for computing an exemplary one of the smoothed components of target acceleration ($a_{TN}$), resolved in the non-rotating Cartesian coordinate system of interest, and employing the corresponding components of range ($R_N$) and weapon platform velocity ($V_{AN}$). There is provided signal summing means 18 having a first input 19 responsive to resolved range signal $KR_N$ and having a second input 20 coupled to an output of a first signal integrator 15 having a summing input, one terminal 16 of which summing input is responsive to resolved weapon platform velocity $V_{AN}$. There is also provided a second integrator 23 having an input responsively coupled to the output of summing means 18. The summing input of first integrator 15 is further responsively coupled to the input to and an output of second integrator 23.

Integrators 15 and 23 are arranged to cooperate with summing means 18 in negative feedback fashion to provide a second order response, the mathematical model for which may be derived similarly as was that for the first order response, explained in connection with the description of the single integrator arrangement of FIG. 3. The input to first integrator 15 from the input of second integrator 23 (output of summing means 18) serves as a damping input to prevent second-order "ringing," as will be explained more fully hereinafter. Therefore, such input is suitably scaled ($t_D$) by scaling means 22 to provide that degree of damping desired.

The relationship of the output of summing means 18 to the combined inputs applied to the arrangement of FIG. 4 may be appreciated from a treatment of the closed loop response to each of such inputs: Let $$a_{TN} = a_{TN}(KR_N) + a_{TN}(V_{AN}) \qquad (9)$$

which indicates that such component of the resolved target accleration ($a_{TN}$) is equal to the sum of the separate components thereof as respective functions of $V_{AN}$ and $R_N$, respectively. Considering the function $a_{TN}(V_{AN})$:

$$\frac{a_{TN}(V_{AN})}{V_{AN}} = \frac{K/s}{1 + \frac{KT_D}{s} + K/s^2} \quad (10)$$

Rearranging:

$$\frac{a_{TN}(V_{AN})}{V_{AN}} = \frac{s}{[s^2/K + sT_D + 1]} \quad (11)$$

$$a_{TN}(V_{AN}) = \frac{sV_{AN}}{[s^2/K + sT_D + 1]} \quad (12)$$

This latter expression is seen to represent the differentiation of ownship velocity (as indicated by the free $s$ term), coupled with a second order filtering term. Such second order filtering term effects smoothing where K is selected to correspond to the square of an upper cut-off frequency of interest and where the term $T_D$ is selected to provide a desired degree of damping of such second order term, as is well understood in the filter art.

Considering the second function, $a_{TN}(R_N)$ of Equation (9):

$$\frac{a_{TN}(KR_N)}{KR_N} = \frac{1}{1 + \frac{KT_D}{s} + \frac{K}{s^2}} \quad (13)$$

Rearranging:

$$\frac{a_{TN}(KR_N)}{KR_N} = \frac{s^2/K}{[s^2/K + sT_D + 1]} \quad (14)$$

$$a_{TN}(KR_N) = \frac{s^2 R_N}{[s^2/K + sT_D + 1]} \quad (15)$$

Substituting Equations (12) and (15) in Equation (9):

$$a_{TN} = \frac{s^2 R_N + sV_{AN}}{[s^2/K + sT_D + 1]} = \frac{\ddot{R}_N + \dot{V}_{AN}}{[s^2/K + sT_D + 1]} \quad (16)$$

Where the processing for the acceleration components, in accordance with Equation (16), is effected by the filter processing means 14 of FIG. 2, the inputs to such element necessarily include $R_N$, $R_E$ and $R_Z$ (outputs of element 12) in addition to the illustrated inputs, $V_{TN}$, $V_{TE}$ and $V_{TZ}$.

Because the filtered velocity and acceleration components of target motion are so-filtered or smoothed as to avoid lagging of ownship data or destabilization of the airframe maneuver weapons control loop, heavier filtering may be successfully employed for increased target prediction smoothing. For example, although the velocity component outputs of element 13 in FIG. 2 have been described as being inherently first-order filtered and the acceleration component outputs of element 14 as second order filtered, with further non-linear filtering, such as Kalman or other digital filtering, being applied by element 14, the concept of the invention is not so limited. Second order filtering may be employed in generating velocity components $V_{TN}$, $V_{TE}$ and $V_{TZ}$, as well as in the generation of the acceleration components $a_{TN}$, $a_{TE}$ and $a_{TZ}$. Alternatively, non-linear filtering may be employed exclusively in the generation of the velocity and acceleration components as to obviate separate and further filter-processing of such components.

Although such acceleration components are useful in second order prediction in a fire control computer, such data may also be employed, for example, in the range-tracking unit (RTU) of the inertially-stabilized tracking radar 11 of FIG. 2. Such an exemplary utilization of such data is shown in simplified form for a single axis case in FIG. 5.

Figure 5:
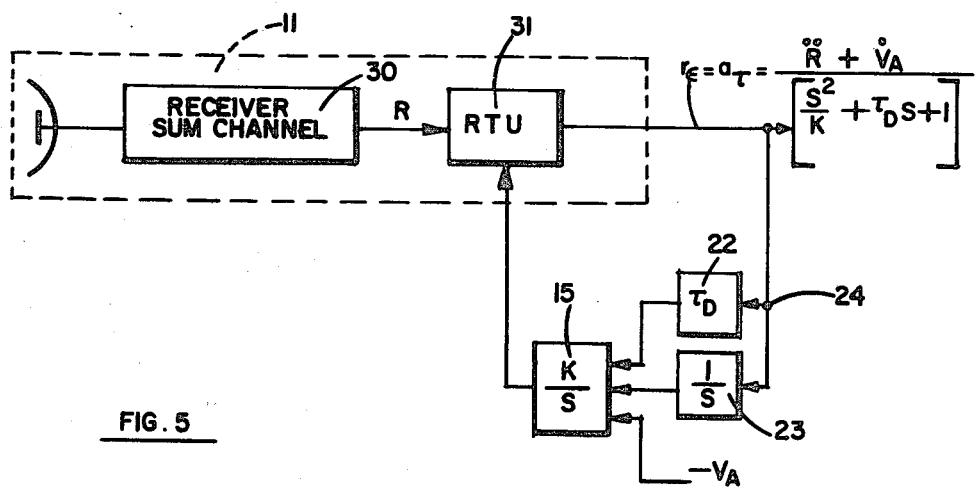
FIG. 5 is a simplified block diagram, illustrating the application of the second order computing concept of FIG. 4 to the control of the range-tracking unit of a tracking radar.

Referring to FIG. 5, there is illustrated a tracking radar 11 such as an angle tracking monopulse radar, the sum channel output of the receiver 30 of which cooperates with a target range-tracking unit (RTU) 31 thereof. The arrangement and cooperation of a monopulse receiver having a range-tracker is understood in the art, being somewhat fully described in U.S. Pat. No. 3,177,484 issued to R. O. Case, Jr., et al, for Position Indicating System. The damped doubly integrating computation loop of FIG. 4 is closed about RTU 31, the output of integrator 15 being applied as a computed range input to RTU 31 and the range error or control output of RTU 31 being applied as an input to terminal 24 of the doubly integrating computer. As is well understood in the servomechanism art, a difference between the range signal input to RTU 31 from receiver 30 and the computed range input thereto from the double integrator will result in a difference signal output $r_\epsilon$ having certain properties under certain circumstances. For example, under a target tracking situation where the angle-tracking controls of the monopulse radar maintain the radar boresight axis directed toward the target, the steady-state range error or output of the RTU 31 will tend to be zero; however, where the radial range of the target is accelerating, (i.e., the range rate, itself, is changing) then the steady state RTU error or output is indicative of the steady-state target radial acceleration.

The arrangement of FIG. 5, is, of course, over-simplified. For example, the actual computed range $R_c$ is to be computed as the square root of the sum of the square of the range components determined in the preselected inertially stabilized Cartesian coordinate system. Also, although the schematic arrangement computes the target range and acceleration components for control of the RTU 31, such arrangement yet does not employ such target acceleration components to reduce tracking errors in the angle-tracking controls of the tracking radar 11, which additional feature is shown in FIG. 6.

Figure 6:
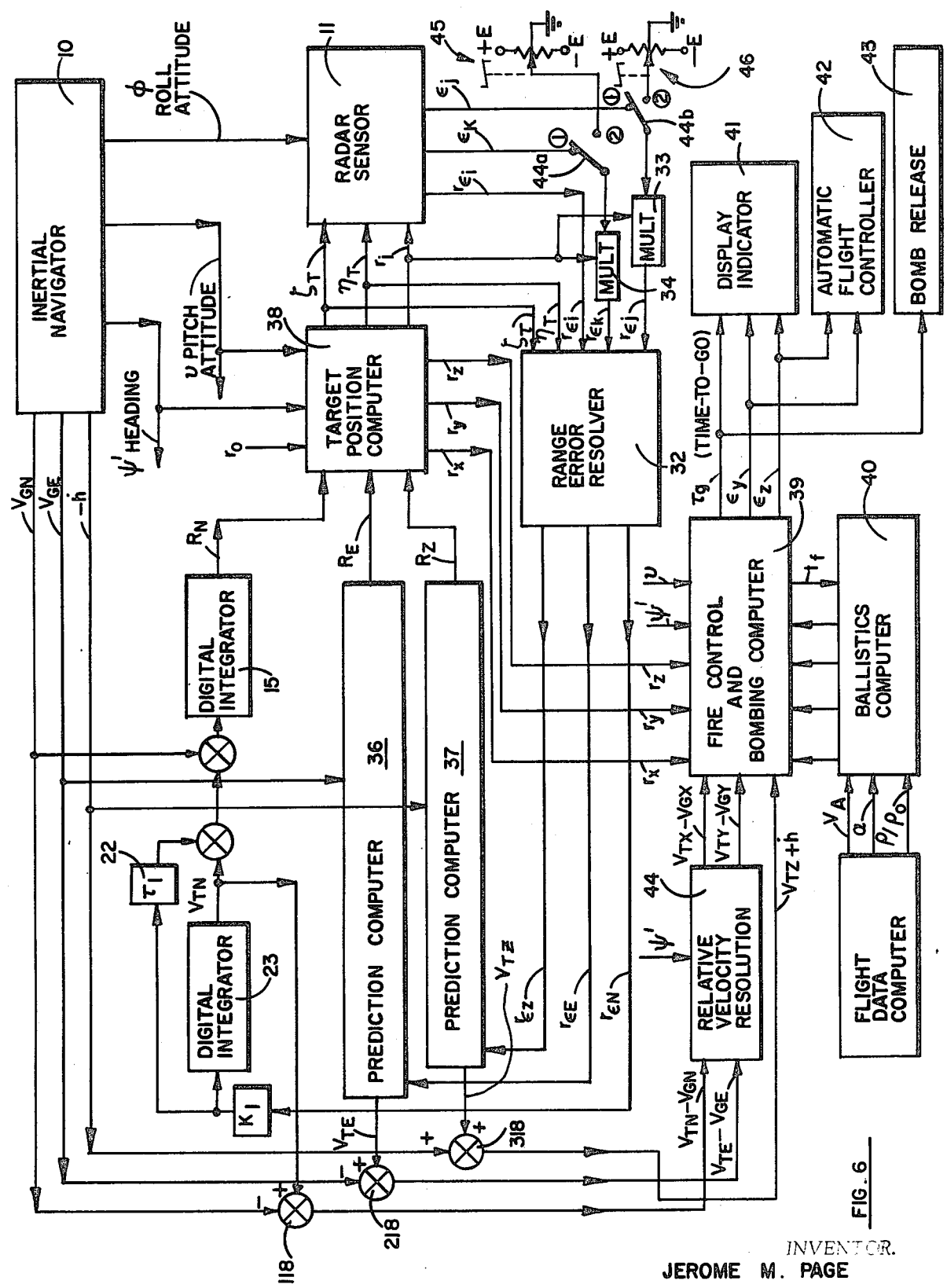
FIG. 6 is a block diagram of a preferred embodiment of the invention, in which the concept is applied to both range-tracking and angle tracking control of a tracking radar and to weapon system prediction and control of the weapon platform employing such tracking radar or equivalent sensor.

Referring now to FIG. 6, there is illustrated in block diagram form a preferred embodiment of the inventive concept in which radar tracking is combined with the prediction computation, which computation generates first and second order prediction terms and also provides improved stabilization of the radar in inertial coordinates against aircraft maneuvers. There is provided an inertially roll-stabilized range-and angle-tracking radar 11 which provides output signals indicative of the range tracking error $r_{ei}$ and the angle tracking errors $\epsilon_k$ and $\epsilon_j$. Range error resolution means responsive to a set of computed inertially stabilized polar coordinate target position data $\zeta_T$, $\eta_T$ and $r_i$, is provided for resolving the radar tracking error output signals relative to that preselected inertially stabilized Cartesian coordinate system in which an associated inertial navigator system 10 provides resolved platform (ownship) velocity data ($V_{GN}$, $V_{GE}$ and $\dot{h}$). Such resolution means comprises a range error resolver 32 and multipliers 33 and 34 for computing the resolved range error components $r_{\epsilon N}$, $r_{\epsilon E}$ and $r_{\epsilon Z}$ in accordance with the following set of relationships:

$$\left. \begin{array}{l} r_{\epsilon Z} = -r_\epsilon \sin\eta_T \cos\zeta_T + r_\epsilon \sin\zeta_T \sin\eta_T + r_{\epsilon K} \cos\eta_T \\ r_{\epsilon N} = r_{\epsilon X} \cos\psi' - r_{\epsilon Y} \sin\psi' \\ r_{\epsilon E} = r_{\epsilon X} \sin\psi' + r_{\epsilon Y} \cos\psi' \\ \text{where:} \\ r_{\epsilon X} = r_\epsilon \cos\zeta_T \cos\eta_T - r_\epsilon \sin\zeta_T \cos\eta_T + r_{\epsilon K} \sin\eta_T \end{array} \right\} \quad (17)$$

-continued $$r_{\epsilon Y} = r_{\epsilon}\sin\zeta_T + r_{\epsilon}\cos\zeta_T$$

Such computational scheme may be either analog or digital or any hybrid computing arrangement as may be preferred, as is understood in the computing art.

There is also provided doubly integrating feedback means responsive to the resolved tracking errors $r_{\epsilon N}$, $r_{\epsilon E}$ and $r_{\epsilon Z}$ for computing the components $R_N$, $R_E$ and $R_Z$ of target position, resolved in the preselected inertially stabilized Cartesian coordinate system (of navigation system 10). Three separate but like computing channels are employed, one for each range error component. The first channel is comprises of a first integrator 15 responsively connected to the input and output respectively of a second integrator 23, scaling means 22 being interposed at the damping input to first integrator 15, in like manner as was explained in connection with the description of FIG. 4, the common input $r_{\epsilon N}$ to each of integrator 23 and gain scaling means 22 (in FIG. 6) being the $r_{\epsilon N}$ output of resolver 32. Because the second and third channels 36 and 37 of the doubly integrating means are similarly constructed and arranged as the first channel, for the processing of $r_{\epsilon E}$ and $r_{\epsilon Z}$ respectively, such elements are illustrated in FIG. 6 in block form only.

A target position computer 38 responsive to ownship heading $\psi'$ and pitch attitude $\nu$, (as determined by inertial navigator 10) and further responsive to the resolved target range components $R_N$, $R_E$ and $R_Z$ (computed by the doubly integrating feedback means) further computes the ownship stabilized polar coordinates $\zeta_T$, $\eta_T$ and $r_i$ of the computed target position (for control of radar 11) in accordance with the following set of relationship:

$$\left. \begin{array}{l} r_i = r_X\cos\zeta_T\cos\eta_T + r_Y\sin\zeta_T - r_Z\sin\eta_T\cos \\ r_j = r_X\sin\zeta_T\cos\eta_T + r_Y\cos\zeta_T + r_Z\sin\zeta_T\sin\eta_T = 0 \\ r_k = r_X\sin\eta_T + r_Z\cos\eta_T = 0 \end{array} \right\} \quad (18)$$

The simultaneous set of equations (2) is solved iteratively for $r_j = 0$ and $r_k = 0$, by changing $\eta_T$ and $\zeta_T$. Upon such solution, the tracking radar line of sight is directed toward the predicted target position and $r_i$ then corresponds to the correct slant range. The range components $r_X$, $r_Y$ and $r_Z$ are also available from such composition. Such data set is employed by the tracking radar 11, where the radar range tracking and angle-tracking loops are thus closed about an inertially stabilized Cartesian coordinate second order prediction system, and in which second order filtering of target data is effected without either the filtering of ownship motion data or the insertion of lags in ownship weapon maneuvering control loops. Further, second order prediction is employed for improved radar angle tracking performance and without the use of performance-limited rate gyros.

The weapon control system of FIG. 6 also includes weapon control means for weapon vehicle guidance and weapon fire control, and comprises a fire control and bombing computer 39 in cooperation with a ballistic computer 40 to generate steering ($\epsilon_Y$ and $\epsilon_Z$) and time-to-go ($\tau_g$) signals for utilization by a display indicator 41, an automatic flight controller 42 or bomb release means 43. In addition to the polar coordinate target position data, $\zeta_T$, $\eta_T$ and $r_i$, provided to tracking radar 11, target position computer 38 also provides a second output data set ($r_X$, $r_Y$ and $r_X$), resolved into that coordinate system (X, Y, Z) employed by the weapon control computer 39. Computer 39 also utilizes the relative velocity or target range rate, resolved into the weapon computer (X, Y, Z) coordinate system as ($V_{TX} - V_{GX}$), ($V_{TY} - V_{GY}$), and ($V_{TZ} + \dot{h}$). Each of these components represents the velocity difference between the weapon platform $V_G$ (as determined by inertial navigator 10) and the target velocity $V_T$ (as computed within the doubly integrating feedback means). More particularly, there is provided signal combining means 118, 218, and 319, responsive to a respective one of the components of the platform inertial velocity output of the navigation system 10 and resolved in the preselected inertially stabilized Cartesian coordinate system, and further responsive to a corresponding one of the outputs ($V_{TN}$, $V_{TE}$ and $V_{TZ}$) of a first integrating stage of the doubly integrating means for providing signals indicative of target range rate, ($V_{TN} - V_{GN}$), ($V_{TE} - V_{GE}$) and ($V_{TZ} + \dot{h}$). The relative target velocity or target range rate signals are then resolved by a resolver 44 responsive to own ship heading, $\psi'$, into the ownship coordinate system employed by fire control computer 39.

For example, the output of first channel integrator 23, being a first derivative order higher than the output $R_N$ of integrator 15, is indicative of the first derivative of $R_N$: $V_{TN}$. The differential combining of the resolved target velocity, component $V_{TN}$ and the correspondingly resolved ownship velocity component $V_{GN}$ by differential signal combining means 118 thus generates the target range rate component, ($V_{TN} - V_{GN}$).

The range and angle sensing radar 11 has been described in terms of a closed loop range and angle tracking arrangement, in which the second order prediction of a doubly integrating arrangement is employed, the angle tracking loops being closed by ganged switches 44a and 44b, as illustrated in FIG. 6. However, the concept of the invention is not limited to such closed loop angle tracking arrangement, and the system may be operated in an alternative optical mode by switching switches 44a and 44b to a second state whereby a pilot, optically aided by a display indicator 41, may manually provide azimuth and elevation tracking correction signal inputs by means of potentiometers 45 and 46 for utilization by the second order predictor means.

Accordingly, there has been illustrated improved means for determining the components of target motion, without imposing computational errors on ownship motion data, for improved accuracy in fire control systems utilizing such data, and for allowing effective use of higher-order predictions for yet further improvements in fire control accuracies while avoiding the use of rate gyros. Further, because of the inertially stabilized coordinate system employed for radar stabilization, lower dynamic L.O.S. responses may be employed by the radar systems as to decrease system susceptability to hostile electronic counter measures.

Although the invention has been described and illustrated in detail, it is to be clearly understood that the same is by way of illustration and example only.

I claim:

1. Target tracking apparatus employing second order prediction and comprising in combination
   an inertially roll-stabilized range-and-angle sensor for providing output signals indicative of the range tracking and angle tracking errors thereof;

range error resolution means responsive to a set of computed polar coordinate target position data for resolving the sensor tracking error output signals relative to a preselected inertially stabilized Cartesian coordinate system;

doubly integrating feedback means responsive to said resolved tracking error signals and to velocity outputs of the inertial navigator for computing the components of target position, velocity and acceleration resolved in said Cartesian coordinate system; and target position computing means responsive to said resolved target data components computed by said feedback means for further computing the polar coordinates of said computed target position, said sensor being responsive to said computed polar coordinate target position data.

2. The device of claim 1 in which there is further included in inertial navigator system for providing inertial stabilization of said computed target position data.

3. The device of claim 2 in which said inertial navigator system also provides outputs indicative of platform velocity resolved in said preselected Cartesian coordinate system and in which there is further provided signal combining means responsive to the resolved velocity outputs of said inertial navigator and to the outputs of a first integrating stage of said doubly integrating feedback means for providing signals indicative of computed target velocity, resolved in said preselected Cartesian coordinate system.

4. The device of claim 3 in which said target position computing means also provides computed target position data resolved in an additional coordinate system and in which there is further provided weapon control computing means employing said additional coordinate system and responsively coupled to said inertial navigator system, said target position computing means and to said signal combining means.

5. The device of claim 1 in which there is further provided an inertial navigator system for roll stabilization of said sensor and for pitch and yaw stabilization of the computed polar coordinate target position data.

6. In a weapon control system employing a first preselected target position coordinate system and further including an inertially stabilized range-and-angle sensor and an inertial navigator system, the combination comprising range error resolution means responsive to a set of computed inertially stabilized polar coordinate target position data for resolving the sensor tracking errors relative to a preselect inertially stabilized second Cartesian coordinate system;

doubly integrating feedback means responsive to said resolved tracking errors for computing the components of target position, resolved in said second Cartesian coordinate system;

target position computing means responsive to said doubly-integrating feedback means for resolving said computed target position data in said first preselected target position coordinate system and also into a polar coordinate system, said tracking sensor being responsive to a polar coordinate output of said target position computing means; and signal-combining means responsive to the inertial velocity of said navigator system, resolved in said inertially stabilized second Cartesian coordinate system and to the outputs of a first integrating stage of said doubly integrating means for providing signals indicative of target range rate, resolved in said inertially stabilized second Cartesian coordinate system.

7. The device of claim 6 in which there is further provided means for resolving said target range rate signals into said first preselected target position coordinate system; and weapon control means responsive to said resolved target range rate signals and to said computed target position data resolved in said first preselected target position coordinate system.

8. Apparatus for computing a smoothed inertial velocity component $V_T$ of an observed target, resolved along a preselected coordinate of a Cartesian coordinate system, comprising means for observing the range R of said target and closed loop integrating means responsive to the observed range R of said target, resolved along said preselected coordinate system, and further responsive to the observer's velocity $V_A$, resolved along said preselected coordinate, to provide said smoothed target velocity component in accordance with the following expression:

$$V_T = \frac{sR + V_A}{\tau s + 1}$$

where:
$\tau$ = first order lag time constant
$s$ = Laplace operator.

9. Apparatus for computing a smoothed inertial velocity component of an observed target, resolved along a preselected coordinate of a Cartesian coordinate system, comprising signal integrating means having an input adapted to be responsive to a component of an observer's velocity resolved along said preselected coordinate; and signal summing means providing an output indicative of said smoothed resolved target velocity component and having a first input adapted to be responsive to a signal indicative of the observed range of the target resolved along said preselected coordinate and further having a second input coupled to an output of said signal integrating means, said integrating and summing means cooperating in negative feedback relation.

10. In a weapon control system having an inertial navigator and fire control radar, improved means for deriving steering errors, comprising coordinate converter means responsive to said radar and to ownship heading for converting the radar polar coordinates of target position into Cartesian coordinates in that coordinate system in which the navigator provides ownship position data; and smoothed target velocity computing means responsive to said target position Cartesian coordinate outputs of said target coordinate converter means and further responsive to own vehicle velocity Cartesian coordinate outputs of said navigator for computing smoothed target velocity in Cartesian coordinates;

said target velocity computing means including closed loop integrating means responsive to said target position data $\overline{R}$ and said own vehicle velocity data $\overline{V}_A$ to provide resolved components of target velocity data $\bar{V}_T$ in accordance with the expression:

$$V_T = \frac{s\bar{R} + \bar{V}_A}{\tau s + 1}$$

where:
$\tau$ = first order lag filter time constant
$s$ = Laplace operator.

11. The device of claim 10 in which said smoothed velocity computing means comprises:
signal summing means having a first and second input, said first input being coupled to a component of target range $\bar{R}$, resolved along a preselected coordinate of said coordinate system,
phase-inverting signal integrating means having an output coupled to said second input of said summing means and further having a first input coupled to a component of ownship velocity $\bar{V}_A$ resolved along said preselected coordinate and further having a second input responsively coupled to an output of said summing means, the output signal at said summing means output being indicative of said smooth target velocity.

12. The device of claim 10 in which said smoothed velocity computing means comprises
signal integrating means having an input coupled to a component of ownship's velocity $V_A$ resolving along a preselected coordinate of said coordinate system; and
signal summing means providing an output indicative of smoothed component of target velocity resolved along said preselected coordinate, said signal summing means having a first input responsive to a signal indication of a component target range $\bar{R}$ resolved along said preselected coordinate and further having a second input coupled to an output of said signal integrating means, said integrating and summing means cooperating in negative feedback relation.

13. The device of claim 10 in which said smoothed velocity computing means comprises:
differential signal combining means having a first and second input, said first input being coupled to a component of target range $\bar{R}$, resolved along a preselected coordinate of said coordinate system;
signal integrating means having an output coupled to said second input of said combining means and further having a first input coupled to a component of ownship velocity $\bar{V}_A$ resolved along said preselected coordinate and further having a second input responsively coupled to an output of said combining means, the output signal at said combining means output being indicative of said smooth target velocity.

14. In a weapon control system having an inertial navigator and fire control radar, improved means for deriving steering errors, comprising
coordinate converter means responsive to said radar and to ownship attitude ($\psi$, $\theta$ and $\phi$) for converting the radar polar coordinates of target position to Cartesian coordinates in that coordinate system in which the navigator provides ownship position data; and
smoothed target velocity computing means responsive to said target position Cartesian coordinates outputs of said of target coordinate converter means and further responsive to own vehicle velocity Cartesian coordinate outputs of said navigator for computing smoothed target velocity in Cartesian coordinates,
said target velocity computing means including closed loop integrating means responsive to said target position data $\bar{R}$ and said own vehicle velocity data $\bar{V}_A$ to provide target velocity data $\bar{V}_T$ in accordance with the expression:

$$\bar{V}_T = \frac{s\bar{R} + \bar{V}_A}{\tau s + 1}$$

where:
$\tau$ = first order lag filter time constant
$s$ = Laplace operator.

15. The device of claim 14 in which said smoothed velocity computing means comprises
signal integrating means having an input coupled to a component of ownship's velocity $V_A$ resolving along a preselected coordinate of said coordinate system; and
signal summing means providing an output indicative of smoothed component of target velocity resolved along said preselected coordinate, said signal summing means having a first input responsive to a signal indicative of a component target range $\bar{R}$ resolved along said preselected coordinate and further having a second input coupled to an output of said signal integrating means, said integrating and summing means cooperating in negative feedback relation.

16. Apparatus for computing a smoothed inertial acceleration component $a_T$ of an observed target, resolved along a preselected coordinate of a Cartesian coordinate system, comprising means for observing the range R of said target and closed loop integrating means responsive to the observed range R of said target, resolved along said preselected coordinate system, and further responsive to the observer's velocity $V_A$, resolved along said preselected coordinate, to provide said smooth target acceleration component in accordance with the following expression:

$$a_T = \frac{s^2 KR + sV_A}{s^2/K + sT_D + 1}$$

where:
$K$ = integration gain constant
$T_D$ = first order damping constant
$s$ = Laplace operator.

17. The device of claim 16 in which said smoothed inertial acceleration computing means comprises
first signal integrating means having a first input adapted to be responsive to a component of an observer's velocity resolved along said preselected coordinate and further having a second and third input; and
signal summing means providing an output indicative of said smoothed resolved target acceleration component and having a first input adapted to be responsive to a signal indicative of the observed range of the target resolved along said preselected coordinate and further having a second input coupled to an output of said first signal integrating means; and second signal integrating means having an input responsive to the output of said summing means, said second and third inputs of said first integrating means being responsive to a respective one of an output and said input of said second integrating means, and said integrating and summing means cooperating in negative feedback relation.

18. The device of claim 16 in which said smoothed acceleration computing means comprises signal summing means having a first and second input, said first input adapted to be coupled to a component of target range R resolved along a preselected coordinate of said coordinate system;

first signal integrating means having an output coupled to said second input of said summing means and further having a summing input adapted to be responsive to a component of ownship velocity $\overline{V}_A$ resolved along said preselected coordinate and responsive to the output of said summing means; and second signal integrating means having an input responsively coupled to the output of said summing means, said summing input of said frist signal integrating means being further responsive to an output of said second signal integrating means.

* * * * *